(12) United States Patent
Henry et al.

(10) Patent No.: US 12,520,145 B2
(45) Date of Patent: Jan. 6, 2026

(54) FINE TIME MEASUREMENT LOCATION CONFIGURATION INFORMATION PROTECTION

(71) Applicant: Cisco Technology, Inc., San Jose, CA (US)

(72) Inventors: Jerome Henry, Pittsboro, NC (US); Brian D. Hart, Sunnyvale, CA (US); Peiman Amini, Fremont, CA (US); Stephen M. Orr, Apex, NC (US); Sudhir K. Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 18/495,441

(22) Filed: Oct. 26, 2023

(65) Prior Publication Data

US 2024/0298178 A1    Sep. 5, 2024

Related U.S. Application Data

(60) Provisional application No. 63/487,689, filed on Mar. 1, 2023.

(51) Int. Cl.
*H04L 9/32*        (2006.01)
*H04W 12/069*      (2021.01)
*H04W 12/63*       (2021.01)

(52) U.S. Cl.
CPC ......... *H04W 12/069* (2021.01); *H04L 9/3242* (2013.01); *H04W 12/63* (2021.01)

(58) Field of Classification Search
CPC ..................................................... H04L 9/3242
USPC ........................................................ 713/156
See application file for complete search history.

(56) References Cited

U.S. PATENT DOCUMENTS

| | | | |
|---|---|---|---|
| 2016/0226886 A1 | 8/2016 | Steiner | |
| 2017/0064575 A1 | 3/2017 | Eyal et al. | |
| 2017/0257758 A1 | 9/2017 | Aldana et al. | |
| 2018/0167812 A1* | 6/2018 | Nagarajamoorthy | ... H04W 4/80 |
| 2019/0014466 A1 | 1/2019 | Seok et al. | |
| 2022/0201480 A1 | 6/2022 | Luo et al. | |
| 2024/0289466 A1* | 8/2024 | Powiertowski | ....... G06F 21/602 |

* cited by examiner

*Primary Examiner* — Anthony D Brown
(74) *Attorney, Agent, or Firm* — Merchant & Gould P.C.

(57) ABSTRACT

Fine Time Measurement (FTM) Location Configuration Information (LCI) protection and, specifically, FTM LCI protection with authentication and selective client enablement may be provided. To perform FTM LCI protection, a controller may first obtain a key-pair including a public key and a private key from a Certificate Authority (CA). The controller my determine a venue location where an Access Point (AP) is located. The controller may send a Certificate Signing Request (CSR) with the venue location to the CA. In response to sending the CSR, the controller may receive a public key certificate from the CA, wherein the public key certificate includes the venue location. The AP may receive a request for Location Configuration Information (LCI) from a Station (STA), wherein the LCI includes an AP location. The AP creates a hash of LCI of the AP using the private key and sends the LCI and the hash to the STA.

18 Claims, 6 Drawing Sheets

FINE TIME MEASUREMENT LOCATION CONFIGURATION INFORMATION PROTECTION

RELATED APPLICATION

Under provisions of 35 U.S.C. § 119(e), Applicant claims the benefit of U.S. Provisional Application No. 63/487,689, filed Mar. 1, 2023, which is incorporated herein by reference.

TECHNICAL FIELD

The present disclosure relates generally to providing Fine Time Measurement (FTM) Location Configuration Information (LCI) protection and specifically to providing FTM LCI protection with authentication and selective client enablement.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
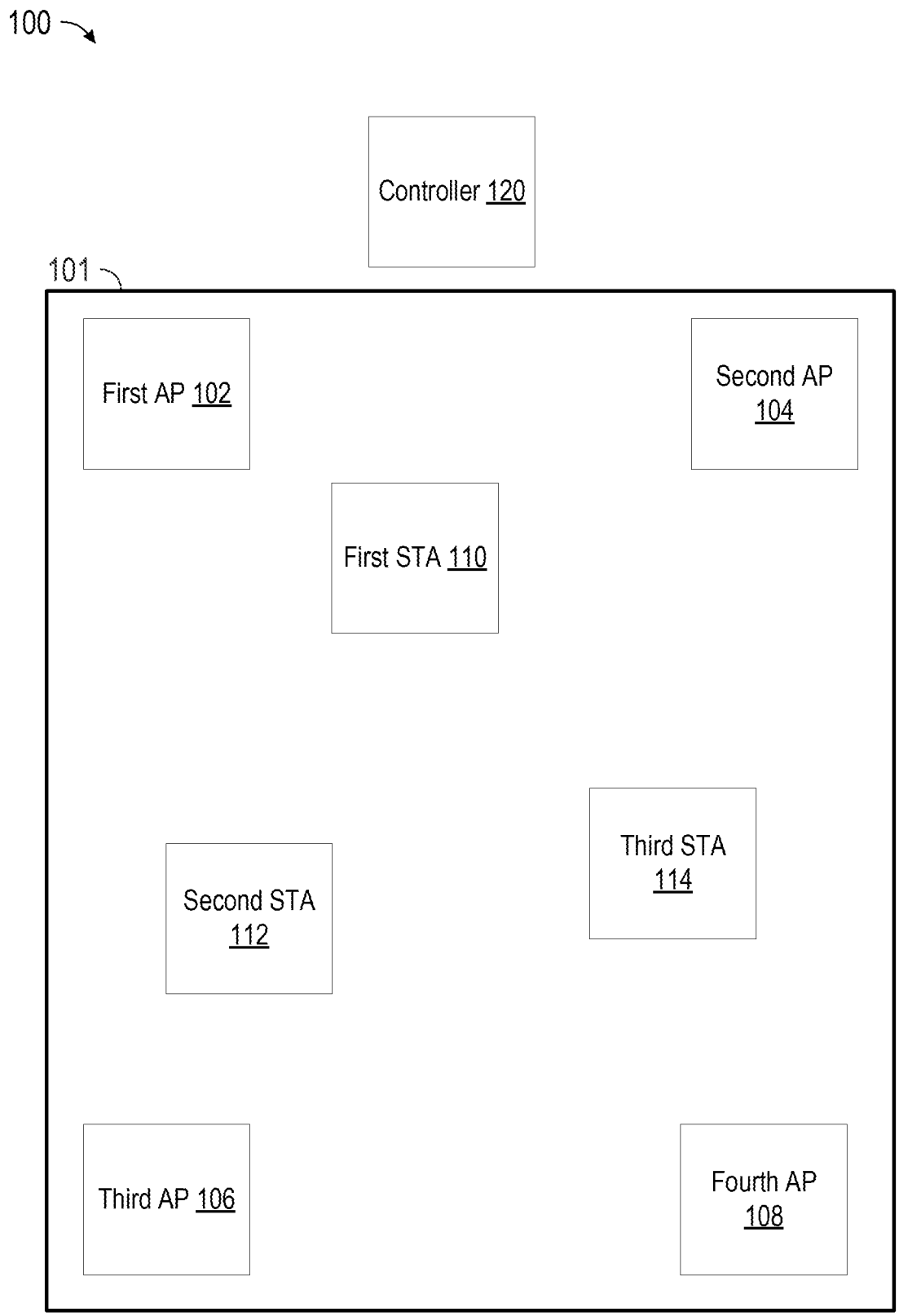
FIG. 1 is a block diagram of an operating environment for Fine Time Measurement (FTM) Location Configuration Information (LCI) protection.

Fine Time Measurement (FTM) Location Configuration Information (LCI) protection and, specifically, FTM LCI protection with authentication and selective client enablement may be provided. To perform FTM LCI protection, a controller may first obtain a key-pair including a public key and a private key from a Certificate Authority (CA). The controller my determine a venue location of a venue where an Access Point (AP) is located. The controller may then send a Certificate Signing Request (CSR) with the venue location to the CA. In response to sending the CSR, the controller may receive a public key certificate from the CA, wherein the public key certificate includes the venue location. The AP may receive a request for Location Configuration Information (LCI) from a Station (STA), wherein the LCI includes an AP location. The AP may create a hash of LCI of the AP using the private key and send the LCI and the hash of the LCI to the STA.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Fine Time Measurement (FTM) is a ranging technique using time of flight of signals. The Institute of Electrical and Electronics Engineers (IEEE) 802.11-2016 standard describes the FTM technique. An initiating Station (STA), usually a client device, may initiate the FTM ranging exchange with a responding STA, usually an Access Point (AP). The responding STA may exchange messages (e.g., FTM frames, Acknowledge (ACK) frames) with the initiating STA, enabling the initiating STA to measure the times of flight of the messages. The initiating STA may determine the distance to the responding STA based on the times of flight. Once an initiating STA uses FTM to determine its position relative to the responding STA, the initiating STA, in the same exchange or another exchange, can query the responding STA for its Location Configuration Information (LCI). The LCI may be a civic or geo-coordinate value.

As described by the IEEE 802.11k standard, an STA may send a Measurement Request to receive LCI from an AP, and the AP may send a Measurement Report frame in response to the Measurement Request. The Measurement Report frame may include LCI associated with the STA sending the Measurement Report frame. Additionally described by the IEEE 802.11k standard, an STA may request a Neighbor Report from an AP to receive LCI associated with one or more APs. The AP may send a Neighbor Report frame back to the STA in response, the Neighbor Report frame including a Neighbor Report element for each AP in the Neighbor Report. Each Neighbor Report element may contain information about the AP and/or one or more neighbor APs, each including an LCI of the associated AP for example. A STA may also use the Measurement Report and/or Neighbor Report to initiate FTM sessions. For example, an STA may initiate FTM sessions based on an order of APs in a Neighbor Report. LCIs are additionally available via the Generic Advertisement Service (GAS) query protocol with similar characteristics.

In the IEEE 802.11-2016 standard, the FTM exchange is unprotected, the LCI exchange in an FTM frame is unprotected, the LCI in the GAS query protocol is unprotected, and the LCI in a Measurement Report frame and/or LCIs from Neighbor Report elements, each containing an LCI, in a Neighbor Report frame are unprotected if conducted outside an association or if conducted within an association without Protected Management Frames (PMF). Additionally, current FTM methods do not include any geographical authentication of the responding STA to validate the LCI information, even for LCIs sent via Measurement Report and/or Neighbor Report frames using PMF.

The IEEE 802.11az-2022 standard allows for management frame protection via Pre-Authentication Security Negotiation (PASN). PASN may enable the use of protected FTM Request and FTM frames and protected Land Mobile Radio (LMR) reports (i.e., reports that include ranging measurements). However, the described PASN management frame protection does not include an authentication scheme because an STA may operate without associating with most APs of the network. An initiating STA may still securely and efficiently retrieve LCIs via sub-elements in a Neighbor Report from an associated AP that uses PMF, but the interaction with the associated AP that uses PMF still provides no geographical authentication and a variable level of AP-level authentication.

A lack of authentication as described above may result in STAs being unable to determine whether any AP providing LCI and/or ranging is legitimate (e.g., whether the AP is actually associated with a venue and not an attacker AP volunteering poisoned LCIs, even if the ranges are valid). In some cases, only a set of client devices may be expected to obtain an accurate location using FTM, but the lack of client authentication may an prevent an AP from filtering the LCI recipient. Therefore, methods for authenticating LCIs during FTM, Measurement Report, and/or Neighbor Report exchanges and/or client authentication can improve the STA ranging process.

FIG. 1. is a block diagram of an operating environment 100 for Fine Time Measurement (FTM) Location Configuration Information (LCI) protection. The operating environment 100 may include a venue 101, a first AP 102, a second AP 104, a third AP 106, a fourth AP 108, a first STA 110, a second STA 112, a third STA 114, and a controller 120. The venue 101 may be any area such as a building, a campus, and/or the like. The first AP 102, the second AP 104, the third AP 106, and the fourth AP 108 may be devices that allow other devices (e.g., the first STA 110, the second STA 112, the third STA 114) to access the network. The first STA 110, the second STA 112, and the third STA 114 may be client devices (e.g., smartphones, personal computers, tablets, laptops, etc.). The controller 120 may be a network controller (e.g., a Wireless Local Area Network (WLAN) controller) that controls the operation of the devices that allow devices to connect to the network, including the first AP 102, the second AP 104, the third AP 106, and/or the fourth AP 108. The controller 120 may be inside or outside the venue 101 and may serve multiple venues in addition to the venue 101. The first AP 102, the second AP 104, the third AP 106, and the fourth AP 108 may be responding STAs that can provide LCIs to the initiating STAs—the first STA 110, the second STA 112, and the third STA 114.

In the operating environment 100, any initiating STA, such as the first STA 110, the second STA 112, and the third STA 114, may be allowed to receive an LCI from the first AP 102, the second AP 104, the third AP 106, and/or the fourth AP 108. However, the first STA 110, the second STA 112, and the third STA 114 may not know if the APs and the associated LCIs are legitimate. The first STA 110, the second STA 112, and/or the third STA 114 may therefore authenticate the LCI during FTM, Measurement Report, and/or Neighbor Report exchanges.

To enable the authentication process, the controller 120 may obtain a key-pair including a public key and a private key. The controller 120 may obtain the key-pair from a trusted or otherwise known root Certificate Authority (CA) for each venue, the controller 120 serves, including the venue 101. When the controller 120 obtains the key-pair from the root CA, the controller 120 may send a Certificate Signing Request (CSR) to the root CA to receive a public key certificate that proves the validity of the public key of the key-pair. The controller 120 may indicate the approximate location of the target venue in the CSR and/or the public key of the key-pair associated with the target venue. For example, to obtain a key-pair for the venue 101, the controller 120 may indicate the approximate location of the venue 101 in the CSR. The controller 120 may use CSR fields such as the locality, organization name, and/or option fields to indicate the location of the venue 101. The location the controller 120 provides may be an approximation of the venue 101 location (e.g., the provided location is only accurate to some decimals lower than the accuracy of each corner of the venue 101). For example, the venue 101 may have Global Positioning System (GPS) coordinates that range from latitude 37.41816 Decimal Degrees (DD) to 37.419185 DD and longitude −121.919579 DD to −121.918762 DD, and the controller 120 indicate the venue 101 location as latitude 37.419 DD and longitude −121.919 DD to the root CA. The level of accuracy may be flexible and depend on the size and dimensions of the intended venue where APs are deployed. The root CA may include the provided location in the public key certificate so the first STA 110, the second STA 112, and/or the third STA 114 may verify the intended location of the first AP 102, the second AP 104, the third AP 106, and/or the fourth AP 108.

The controller 120 may provide or otherwise point to the location of the key-pair and public key certificate to the first AP 102, the second AP 104, the third AP 106, and/or the fourth AP 108. The first AP 102, the second AP 104, the third AP 106, and/or the fourth AP 108 may send or otherwise make available the public key and/or public key certificate to the first STA 110, the second STA 112, and/or the third STA 114 for LCI authentication. For example, when the first STA 110 requests LCI from the first AP 102, the first AP 102 may respond with the LCI with a new Information Element (IE) that includes a hash of its LCI (i.e., where the hash is decryptable using the public key) and, optionally, the current time on the first AP 102. The first AP 102 may create the hash of its LCI using the private key. The first AP 102 may also send the public key certificate or point to or otherwise mention the public key certificate.

The first STA 110 may validate the public key and confirm that the geo-location intended for the public key certificate (i.e., the venue location the controller 120 includes in the CSR) matches the overall LCI expressed by the first AP 102. The first STA 110 may have a tolerance range that the first STA 110 may consider as valid because of the lowered accuracy of the location the controller 120 includes in the CSR and/or the particular placement of the first AP 102 in the venue 110. Next, using the public key the first AP 102 provides or otherwise indicates, the first STA 110 may decipher the hash of the LCI to verify the LCI. If the hashed LCI matches the LCI expressed by the first AP 102, then the first STA 110 may consider the first AP 102 and its LCI as valid.

If the first AP 102 also provides the current time, the first STA 110 may determine whether the provided current time is accurate when determining whether the first AP 102 and its LCI is valid. The first STA 110 tolerance for the time accuracy, if present, may be similar to that of the geo-location of the certificate (e.g., the first AP 102 may only occasionally refresh the time, such as hourly or daily). In other embodiments, the first STA 110 may require a more precise time accuracy (e.g., 500 milliseconds, one second, three seconds, one minute).

The first AP 102, the second AP 104, the third AP 106, and the fourth AP 108 may provide different FTM ranges based on the first STA 110, the second STA 112, and/or the third STA 114 positions in the venue 101, but the LCI should be the same for each STA since the LCI indicates the location of the associated AP. Additionally, the first STA 110, the second STA 112, and/or the third STA 114 expects the first AP 102, the second AP 104, the third AP 106, and the fourth AP 108 to have the same type of certificate (i.e., as provided to the APs by the controller 120) and accuracy. Therefore, the first STA 110, the second STA 112, and/or the third STA 114 may choose to initially consider the APs returning the same certificate because an AP with another certificate may not be associated with the venue 101.

Figure 2:
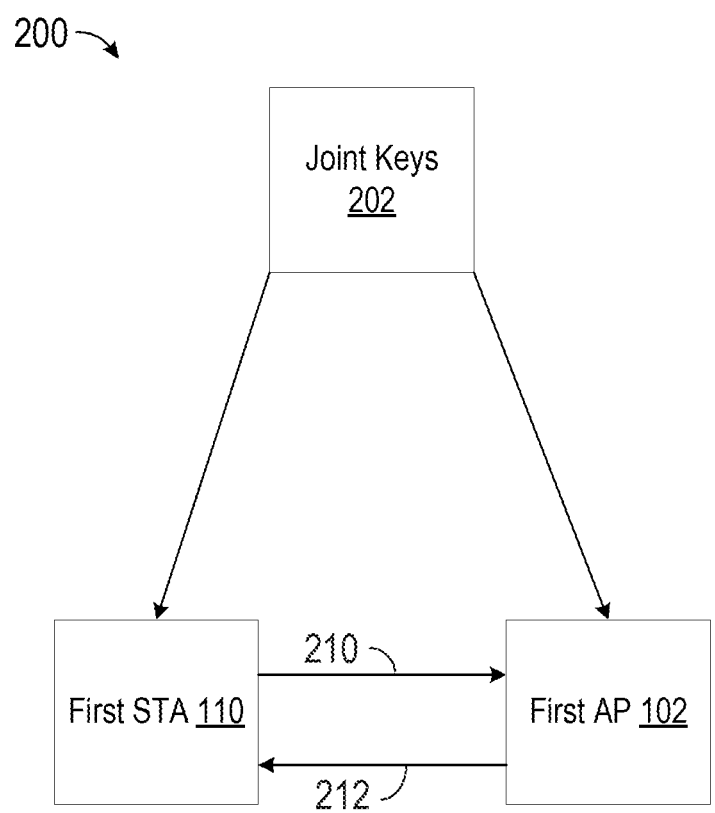
FIG. 2 is a diagram of an example client authentication process for FTM LCI protection.

FIG. 2 is a diagram of an example client authentication process 200 for FTM LCI protection. In some examples, the first AP 102, the second AP 104, the third AP 106, and/or the fourth AP 108 may authenticate the first STA 110, the second STA 112, and the third STA 114 before providing LCI. The client authentication process 200 illustrates the client authentication process 200 between the first AP 102 and the first STA 110 for illustrative purposes, and other combinations of APs and STAs may perform the client authentication process 200.

In some cases, only certain types of STAs are entitled to receive certain types of LCI. For example, a STA associated with the general public may only get LCI with low accuracy, while a STA associated with authorized users (e.g., venue devices, security staff) may get a different LCI with higher accuracy. A STA may range with one or more APs to request to use Peer-to-Peer (P2P) communication, know its location, determine if it is inside or outside, and/or the like. The one or more APs may use the client authentication process 200 to determine whether the STA should be allowed to perform the requested action(s) and determine which LCI, if any, the STA should receive.

In the client authentication process 200, the first STA 110 may or may not first associate with the first AP 102. Thus, first AP 102 can perform the client authentication process 200 and determine whether to send LCI and select which LCI to send without associating with the first STA 110 and/or provide enhanced AP authenticity when associated with the first STA 110.

To perform the client authentication process 200, the participating entities (e.g., STA owner/vendor, AP owner/vendor) may agree on a set of keys to be installed on the STAs and the APs. For example, the joint keys 202 may be the set of keys the first STA 110 and the first AP 102 use. The first AP 102 may send an LCI request 210 that signals its support for encrypted LCI, in a specific IE or frame for example. In some examples, the first STA 110 also points to the key(s) it intends to use (e.g. by indicating the STA name). In other examples, the first AP 102 may indicate the key(s) to use (e.g., with an index or a pointer to the key(s)). To check liveness, a guarantee that the STA and AP will continue exchanging data and will not be shut down by a centralized authority, the first STA 110 may also include a nonce in its request. The nonce may be an arbitrary number (e.g., a random or pseudo-random number issued in an authentication protocol).

The first AP 102 may determine that the first STA 110 is authorized to receive the LCI and then send an LCI response 212 to the LCI request 210 with the LCI. The first AP 102 may encrypt, with the keying material agreed upon by the parties, the LCI value, and nonce if included. The first AP 102 may send the LCI response 212 in a new sub-element, element, or frame with a larger field because containers commonly associated with the LCI field may not allow for the length of an encrypted response.

The first STA 110 may decipher the LCI, checks the nonce if included, and verify that the LCI came from the first AP 102. The first STA 110 may then use the LCI for location determination. In some examples, the first STA 110 may additionally send a confirmation to first AP 102 that the LCI was received (e.g., by sending a management frame). In some examples, the first STA 110 may be unable to decrypt the LCI response 212 and request that the first AP 102 send the LCI encrypted differently for decryption with a different key.

Figure 3:
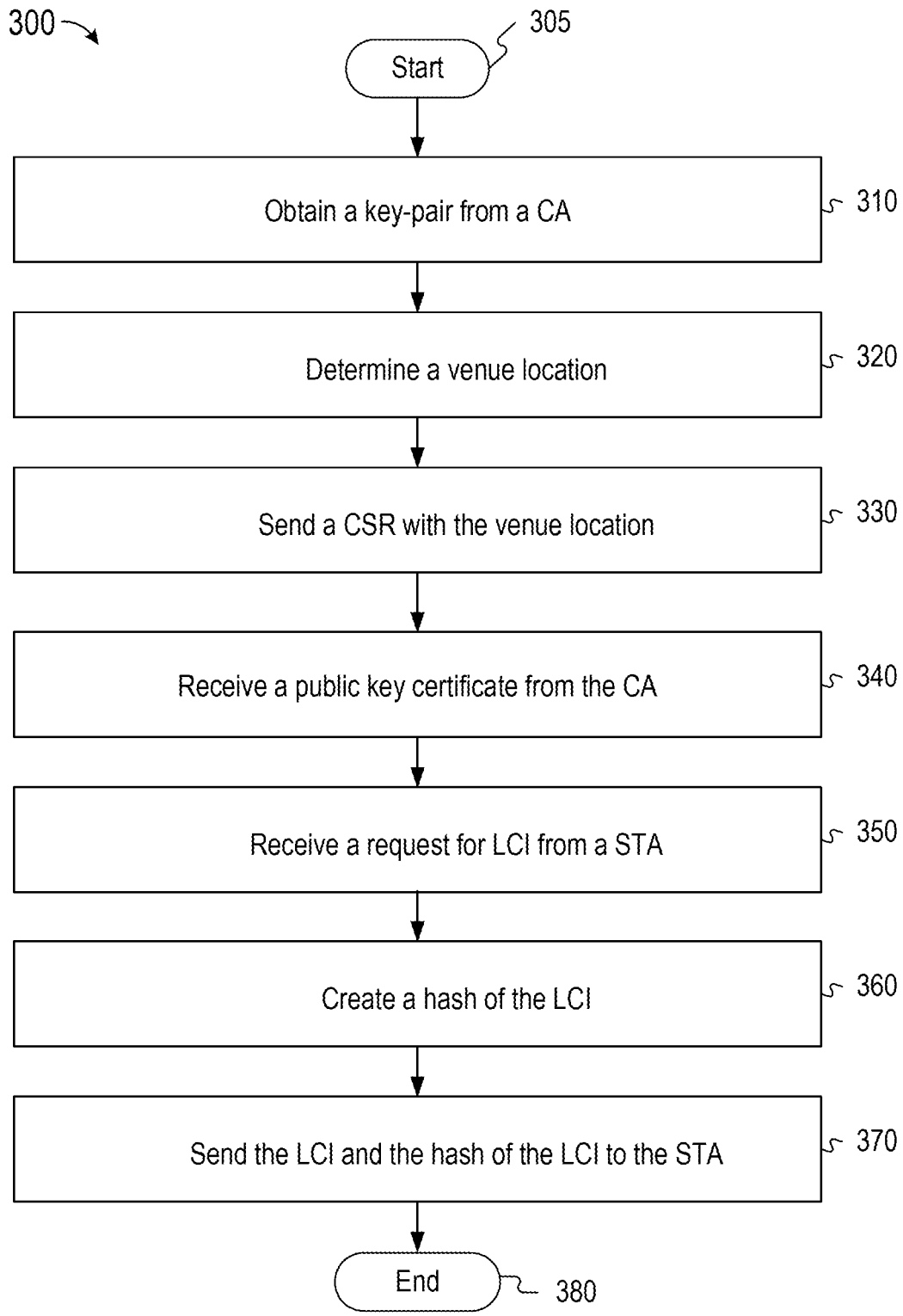
FIG. 3 is a flow chart of a controller and Access Point (AP) method for FTM LCI protection.

FIG. 3 is a flow chart of a controller and AP method 300 for FTM LCI protection. The controller and AP method 300 may begin at starting block 305 and proceed to operation 310. In operation 310, a key-pair may be obtained from a CA. For example, the controller 120 obtains a key-pair including a public key and a private key from the CA. The controller 120 may share or point to the location of the key-pair to the first AP 102, the second AP 104, the third AP 106, and/or the fourth AP 108.

In operation 320, a venue location may be determined. For example, the controller 120 determines a venue location of the venue 101 where an AP (e.g., the first AP 102, the second AP 104, the third AP 106, the fourth AP 108) is located. As described above, the venue location may be an inexact location, but the STA evaluating the venue location and locations in LCI may determine an allowable threshold for the differences.

In operation 330, a CSR may be sent to the CA with the venue location. For example, the controller 120 may send the CSR with the venue location to the CA. In operation 340, a public key certificate may be received from the CA. For example, the CA may generate a public key certificate that includes the venue location in response to the controller 120 sending the CSR in operation 330 and send the CSR to the controller 120. Thus, the controller 120 may receive the public key certificate from the CA, wherein the public key certificate includes the venue location. The controller 120 may share or point to the location of the public key certificate to the first AP 102, the second AP 104, the third AP 106, and/or the fourth AP 108.

In operation 350, an AP may receive a request for LCI from a STA. For example, the first AP 102, the second AP 104, the third AP 106, and/or the fourth AP 108 may receive a request for LCI from the first STA 110, the second STA 112, and/or the third STA 114. The request may be a Measurement Report request, a Neighbor Report request, a GAS query, and/or the like. The AP(s) may receive the request for LCI after performing FTM ranging with the STA(s).

In operation 360, the AP may create a hash of LCI of the AP. For example, the first AP 102, the second AP 104, the third AP 106, and/or the fourth AP 108 may create a hash of its LCI using the private key obtained in operation 310.

In operation 370, the AP may send the LCI and the hash of the LCI to the STA. For example, the first AP 102, the second AP 104, the third AP 106, and/or the fourth AP 108 may send the LCI of the AP and the hash of the LCI to the first STA 110, the second STA 112, and/or the third STA 114. The AP(s) may additionally send or point to the location of the public key and/or send or point to the location of the public key certificate. The controller and AP method may conclude at ending block 380.

Figure 4:
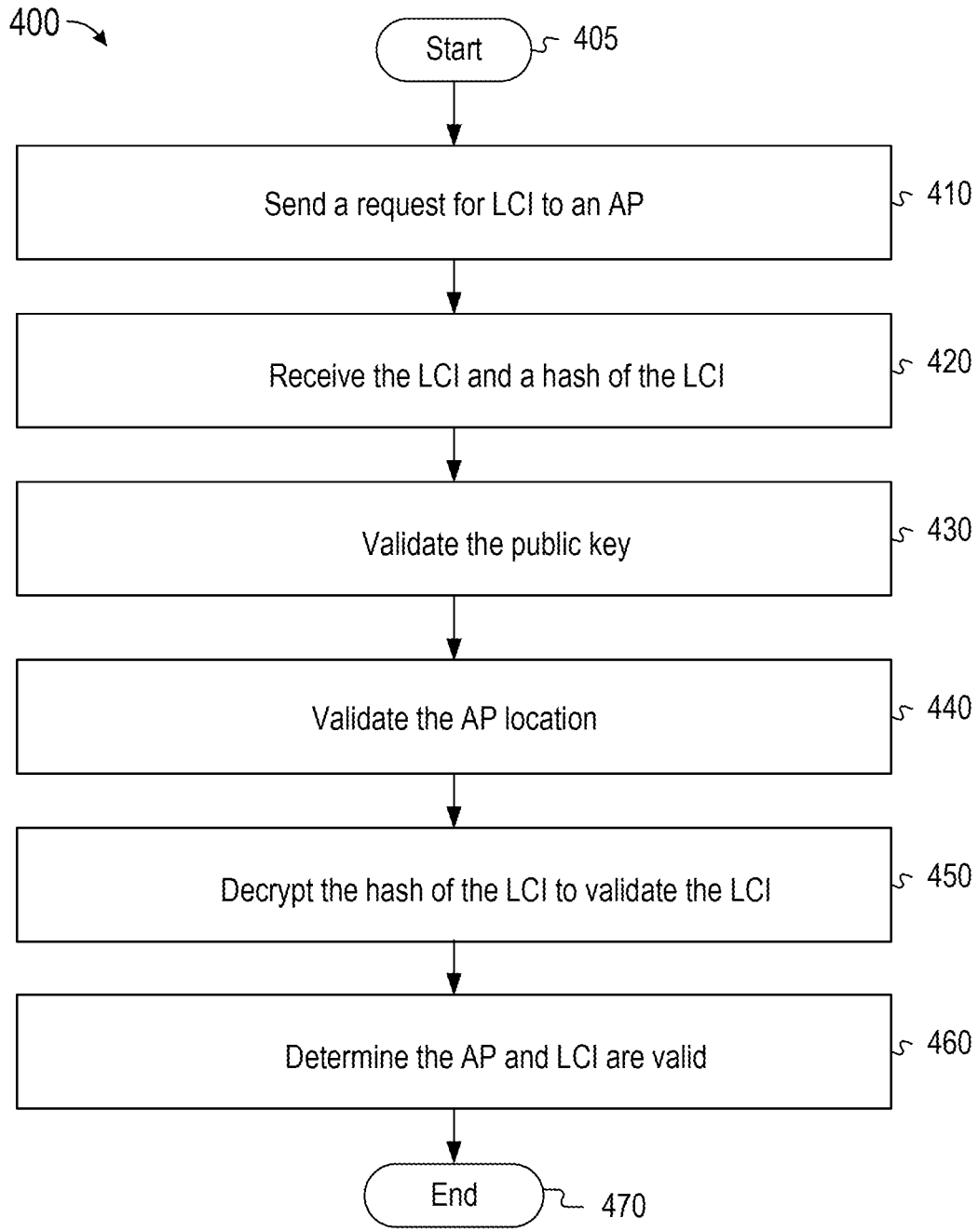
FIG. 4 is a flow chart of a Station (STA) method for FTM LCI protection.

FIG. 4 is a flow chart of a STA method 400 for FTM LCI protection. The STA method 400 may be performed with the controller and AP method 300. The STA method 400 may begin at starting block 405 and proceed to operation 410. In operation 410, an STA may send a request for LCI to an AP. For example, the first STA 110, the second STA 112, and/or the third STA 114 may send request for LCI to the first AP 102, the second AP 104, the third AP 106, and/or the fourth AP 108. The STA(s) may send the request for LCI after performing FTM ranging with the AP(s). The request may be a Measurement Report request, a Neighbor Report request, a GAS query, and/or the like. The AP(s) may receive the request for LCI in operation 350 in response to the STA(s) sending the request for the LCI in operation 410.

In operation 420, the STA may receive the LCI and a hash of the LCI. For example, the first STA 110, the second STA 112, and/or the third STA 114 may receive the LCI and a hash of the LCI from the first AP 102, the second AP 104, the third AP 106, and/or the fourth AP 108 in response to the request sent in operation 410. The STA(s) may additionally receive the public key or receive the location of the public key and/or receive the public key certification or receive the location of the public key certificate. The STA(s) may receive the LCI and the hash of the LCI in operation 420 in response to the AP(s) sending the LCI and the hash of the LCI in operation 370.

In operation 430, the STA may validate the public key. For example, the first STA 110, the second STA 112, and/or the third STA 114 may validate the public key using the public key certificate.

In operation 440, the STA may validate the AP location. For example, the first STA 110, the second STA 112, and/or the third STA 114 may validate the location of the first AP 102, the second AP 104, the third AP 106, and/or the fourth AP 108, obtained from the LCI, with the venue location included in the public key certificate. As described above, the venue location may be inexact, so the first STA 110, the second STA 112, and/or the third STA 114 may have an allowable threshold for the difference between the AP location and the venue location.

In operation 450, the STA may decrypt the hash of the LCI to verify the LCI. For example, the first STA 110, the second STA 112, and/or the third STA 114 may decrypt hash of the LCI using the public key to verify the LCI. The STA(s) may compare the LCI and the decrypted hash of the LCI to determine whether the two match. The STA(s) may verify the LCI is valid if the LCI matches with the decrypted hash of the LCI.

In operation 460, the STA may determine the AP and the LCI are valid based on validating the public key, validating the AP location, and decrypting the hash of the LCI to verify the LCI. For example, the first STA 110, the second STA 112, and/or the third STA 114 may determine the first AP 102, the second AP 104, the third AP 106, and/or the fourth AP 108 and the associated LCI are valid based on validating the public key in operation 430, validating the AP location(s) in operation 440, and decrypting the hash of the LCI to verify the LCI in operation 450. The STA method 400 may conclude at ending block 470.

Figure 5:
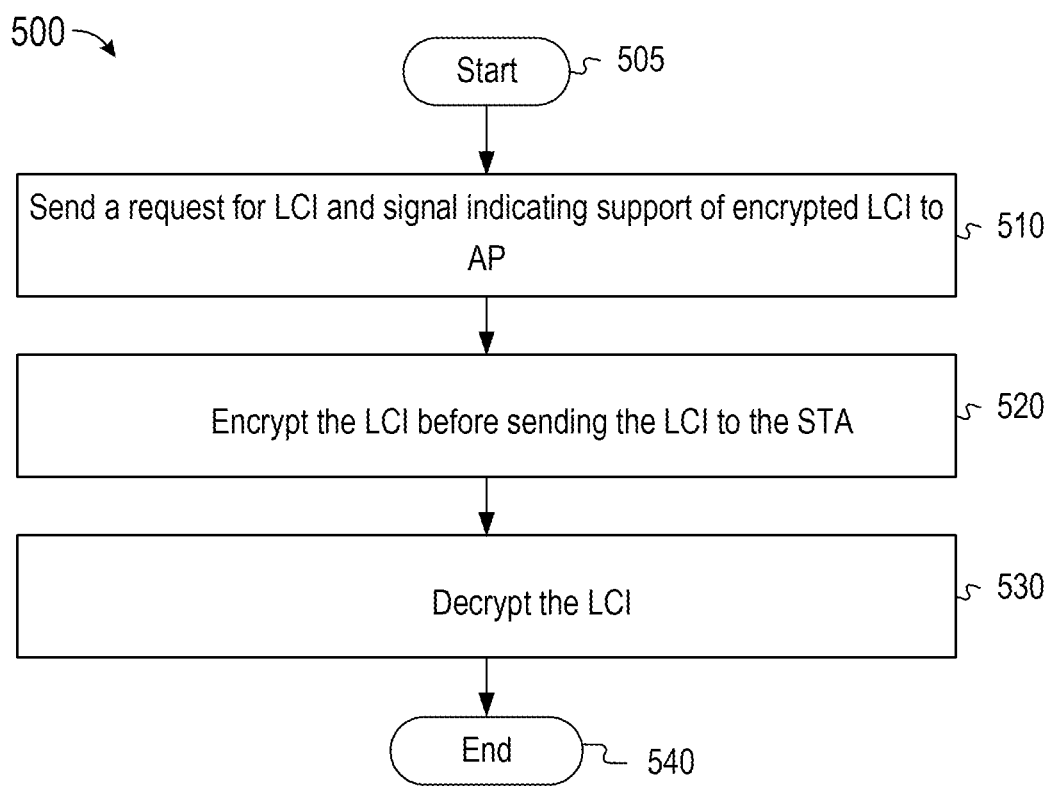
FIG. 5 is a flow chart of a client authentication method for FTM LCI protection.

FIG. 5 is a flow chart of a client authentication method 500 for FTM LCI protection. The client authentication method 500 may be performed with the controller and AP method 300 and/or the STA method 400. The client authentication method 500 may begin at starting block 505 and proceed to operation 510. In operation 510, an STA may send a request for LCI and signal that the STA supports encrypted LCI to an AP. For example, the first STA 110, the second STA 112, and/or the third STA 114 may send the request for LCI and the signal to the first AP 102, the second AP 104, the third AP 106, and/or the fourth AP 108. The STA(s) may send the request for LCI and the signal in operation 410, and the AP(s) may receive the request for LCI and the signal in operation 350.

In operation 520 in response to the signal, the AP may encrypt the LCI before sending the LCI to the STA. For example, the first AP 102, the second AP 104, the third AP 106, and/or the fourth AP 108 may encrypt the associated LCI before sending the LCI to the first STA 110, the second STA 112, and/or the third STA 114 (e.g., the AP sending the LCI in operation 370 and the STA receiving the LCI, now encrypted, in operation 420). The STA(s) and AP(s) may determine keys to use for encryption and decryption (e.g., the joint keys 202) before or during the client authentication method 500.

In operation 530, the STA may decrypt the LCI. For example, the first STA 110, the second STA 112, and/or the third STA 114 may decrypt the LCI before decrypting the hash of the LCI to verify the LCI in operation 450. Thus, the STA may also be required to decrypt the LCI in the STA method 400 before determining the AP and the LCI are valid. The client authentication method 500 may conclude at ending block 540.

Figure 6:
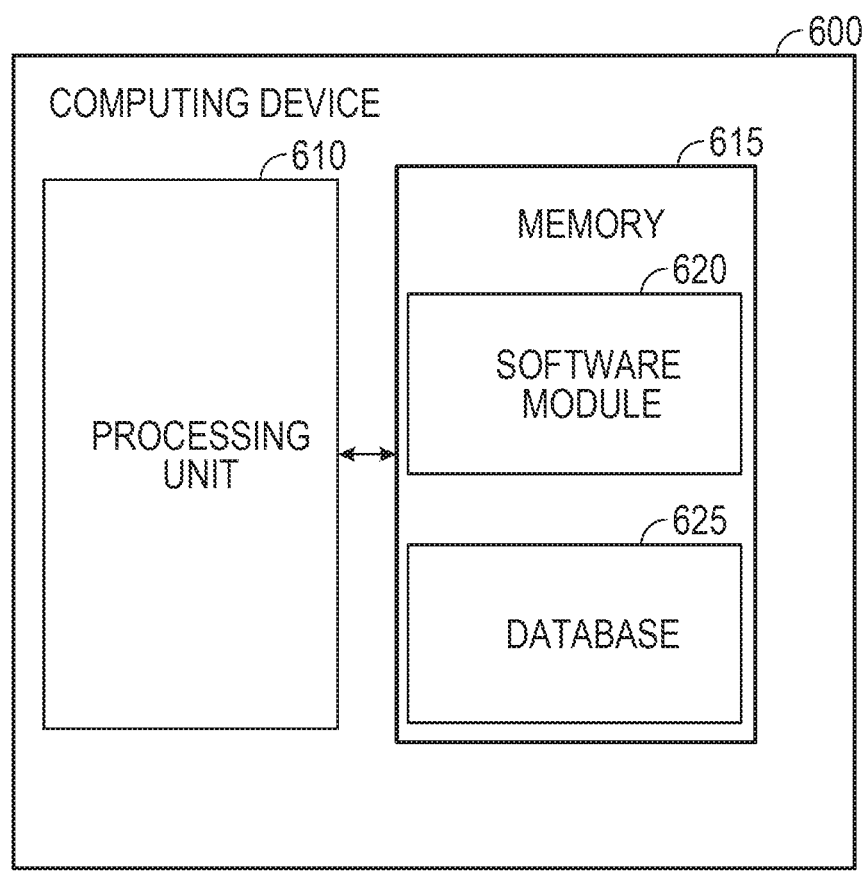
FIG. 6 is a block diagram of a computing device.

FIG. 6 is a block diagram of a computing device 600. As shown in FIG. 6, computing device 600 may include a processing unit 610 and a memory unit 615. Memory unit 615 may include a software module 620 and a database 625. While executing on processing unit 610, software module 620 may perform, for example, processes for FTM LCI protection with respect to FIG. 1, FIG. 2, FIG. 3, FIG. 4, and FIG. 5. Computing device 600, for example, may provide an operating environment for the first AP 102, the second AP 104, the third AP 106, the fourth AP 108, the first STA 110, the second STA 112, the third STA 114, the controller 120, and the like. The first AP 102, the second AP 104, the third AP 106, the fourth AP 108, the first STA 110, the second STA 112, the third STA 114, the controller 120, and the like may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples, and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:
1. A method comprising:
obtaining, by a controller, a key-pair including a public key and a private key from a Certificate Authority (CA);
determining, by the controller, a venue location of a venue where an Access Point (AP) is located;
sending, by the controller, a Certificate Signing Request (CSR) with the venue location to the CA;
in response to sending the CSR, receiving, by the controller a public key certificate from the CA, wherein the public key certificate includes the venue location;
receiving, by the AP, a request for Location Configuration Information (LCI) from a Station (STA), wherein the LCI includes an AP location;
creating, by the AP, a hash of the LCI of the AP using the private key; and
sending, by the AP, the LCI and the hash of the LCI to the STA;
sending, by the STA, the request for LCI to the AP;
in response to the request, receiving, by the STA, the LCI, and the hash of the LCI;
validating, by the STA, the public key using the public key certificate;
validating, by the STA, the AP location with the venue location using the public key certificate;
decrypting, by the STA, the hash of the LCI to verify the LCI; and
determining, by the STA, the AP and the LCI are valid based on validating the public key, validating the AP location, and decrypting the hash of the LCI to verify the LCI.

2. The method of claim 1, further comprising:
sending, by the STA, a signal that the STA supports encrypted LCI with the request for the LCI to the AP;
in response to the signal, encrypting, by the AP, the LCI before sending the LCI to the STA; and
decrypting, by the STA, the LCI before decrypting the hash of the LCI to verify the LCI.

3. The method of claim 1, further comprising:
determining, by the STA, a STA location based on the LCI.

4. The method of claim 1, further comprising:
performing Fine Time Measurement (FTM) ranging between the STA and the AP.

5. The method of claim 1, further comprising sending, by the AP, a current time to the STA.

6. The method of claim 5, further comprising:
determining, by the STA, the current time is accurate, wherein determining the AP and the LCI are valid is further based on determining the current time is accurate.

7. The method of claim 1, wherein the request for LCI is any one of a Measurement Report request, a Neighbor Report request, or a Generic Advertisement Service query.

8. The method of claim 1, further comprising any one of sending to the STA, by the AP, (i) the public key, (ii) a first pointer to the location of the public key, (iii) the public key certificate, (iv) a second pointer to the location of the public key certificate, or (v) any combination of (i)-(iv).

9. A system comprising:
a first memory storage;
a first processing unit coupled to the first memory storage, wherein the first processing unit is operative to:
  obtain a key-pair including a public key and a private key from a Certificate Authority (CA);
  determine a venue location of a venue where an Access Point (AP) is located;
  send a Certificate Signing Request (CSR) with the venue location to the CA;
  in response to sending the CSR, receive a public key certificate from the CA, wherein the public key certificate includes the venue location;
  receive a request for Location Configuration Information (LCI) from a Station (STA), wherein the LCI includes an AP location;
  create a hash of the LCI of the AP using the private key; and
  send the LCI and the hash of the LCI to the STA;
a second memory storage; and
a second processing unit coupled to the second memory storage, wherein the second processing unit is operative to:
  send the request for LCI to the AP;
  in response to the request, receive the LCI, and the hash of the LCI;
  validate the public key using the public key certificate;
  validate the AP location with the venue location using the public key certificate;
  decrypt the hash of the LCI to verify the LCI; and
  determine the AP and the LCI are valid based on validating the public key, validating the AP location, and decrypting the hash of the LCI to verify the LCI.

10. The system of claim 9, the processing unit being further operative to:
perform Fine Time Measurement (FTM) ranging with the STA.

11. The system of claim 9, the processing unit being further operative to:
send, a current time to the STA.

12. The system of claim 9, wherein:
the request for LCI is any one of a Measurement Report request, a Neighbor Report request, or a Generic Advertisement Service query.

13. The system of claim 9, the processing unit being further operative to:
perform any one of, send to the STA (i) the public key, (ii) a first pointer to the location of the public key, (iii) the public key certificate, (iv) a second pointer to the location of the public key certificate, or (v) any combination of (i)-(iv).

14. A non-transitory computer-readable medium that stores a set of instructions which when executed perform a method executed by the set of instructions comprising:
obtaining, by a controller, a key-pair including a public key and a private key from a Certificate Authority (CA);
determining, by the controller, a venue location of a venue where an Access Point (AP) is located;
sending, by the controller, a Certificate Signing Request (CSR) with the venue location to the CA;
in response to sending the CSR, receiving, by the controller a public key certificate from the CA, wherein the public key certificate includes the venue location;
receiving, by the AP, a request for Location Configuration Information (LCI) from a Station (STA), wherein the LCI includes an AP location;
creating, by the AP, a hash of the LCI of the AP using the private key;
sending, by the AP, the LCI and the hash of the LCI to the STA;
sending, by the STA, the request for LCI to the AP;
in response to the request, receiving, by the STA, the LCI, and the hash of the LCI;
validating, by the STA, the public key using the public key certificate;
validating, by the STA, the AP location with the venue location using the public key certificate;
decrypting, by the STA, the hash of the LCI to verify the LCI; and
determining, by the STA, the AP and the LCI are valid based on validating the public key, validating the AP location, and decrypting the hash of the LCI to verify the LCI.

15. The non-transitory computer-readable medium of claim 14, the method executed by the set of instructions further comprising:
sending, by the STA, a signal that the STA supports encrypted LCI with the request for the LCI to the AP;
in response to the signal, encrypting, by the AP, the LCI before sending the LCI to the STA; and
decrypting, by the STA, the LCI before decrypting the hash of the LCI to verify the LCI.

16. The non-transitory computer-readable medium of claim 14, the method executed by the set of instructions further comprising:
performing Fine Time Measurement (FTM) ranging between the STA and the AP.

17. The non-transitory computer-readable medium of claim 14, the method executed by the set of instructions further comprising:
sending, by the AP, a current time to the STA.

18. The non-transitory computer-readable medium of claim 14, the method executed by the set of instructions further comprising any one of sending to the STA (i) the public key, (ii) a first pointer to the location of the public key, (iii) the public key certificate, (iv) a second pointer to the location of the public key certificate, or (v) any combination of (i)-(iv).

\* \* \* \* \*